(12) United States Patent
Chang

(10) Patent No.: US 11,020,873 B2
(45) Date of Patent: Jun. 1, 2021

(54) CENTRAL AXIS ADJUSTMENT STRUCTURE OF TAILSTOCK OF WOODWORKING LATHE

(71) Applicant: KINGSAND MACHINERY LTD., Taichung (TW)

(72) Inventor: Chin-Feng Chang, Taichung (TW)

(73) Assignee: KINGSAND MACHINERY LTD., Taichung (TW)

( * ) Notice: Subject to any disclaimer, the term of this patent is extended or adjusted under 35 U.S.C. 154(b) by 0 days.

(21) Appl. No.: 16/572,605

(22) Filed: Sep. 17, 2019

(65) Prior Publication Data
US 2021/0078197 A1    Mar. 18, 2021

(51) Int. Cl.
  *B27C 7/04*      (2006.01)
  *B23B 23/00*     (2006.01)

(52) U.S. Cl.
  CPC ............ *B27C 7/04* (2013.01); *B23B 23/005* (2013.01)

(58) Field of Classification Search
  CPC .... B27C 7/04; B27C 7/00; B27C 7/02; B23B 23/005; B23B 23/025; B23B 23/045
  See application file for complete search history.

(56) References Cited

U.S. PATENT DOCUMENTS

| | | | | |
|---|---|---|---|---|
| 3,057,237 A | * | 10/1962 | Becker ............... | B23B 23/025 82/150 |
| 3,212,373 A | * | 10/1965 | Basso ............... | B24B 41/062 82/150 |
| 3,600,988 A | * | 8/1971 | Davis ............... | B23B 23/005 82/148 |
| 2003/0029285 A1 | * | 2/2003 | Wirth, Jr. ............ | B27C 7/02 82/117 |
| 2003/0177877 A1 | * | 9/2003 | Nguyen ............ | B23B 23/045 82/150 |
| 2008/0127789 A1 | * | 6/2008 | Chou ............... | B23B 23/00 82/148 |
| 2010/0043607 A1 | * | 2/2010 | Chang ............... | B27C 7/02 82/117 |

FOREIGN PATENT DOCUMENTS

CH          228025 A  *  7/1943  ........... B23B 23/005

OTHER PUBLICATIONS

English translation of CH 228025, Jul. 1943 (Year: 1943).*

* cited by examiner

*Primary Examiner* — Alan Snyder
(74) *Attorney, Agent, or Firm* — Raymond Y. Chan; David and Raymond Patent Firm

(57) ABSTRACT

A central axis adjustment structure of a tailstock of a woodworking lathe is disclosed. The tailstock has a circular hole therein, a front opening and a rear opening at front and rear ends of the tailstock. An end surface of the front opening has at least one screw hole. A guide rod is disposed in the circular hole, and has a rear end extending out of the rear opening. A collar is fitted onto an axial connecting shaft that is inserted in the circular hole. The guide rod is insertedly connected to a rear end of the axial connecting shaft. The collar has at least one perforation corresponding to the screw hole. At least one bolt is inserted through the perforation and screwed to the screw hole so that the collar is locked to the front end of the tailstock. A first annular gap is defined between the guide rod and the rear opening of the tailstock. A second annular gap is defined between the axial connecting shaft and the front opening of the tailstock. A third annular gap is defined between the bolt and the perforation of the collar.

7 Claims, 6 Drawing Sheets

A-A

CENTRAL AXIS ADJUSTMENT STRUCTURE OF TAILSTOCK OF WOODWORKING LATHE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a central axis adjustment structure of a tailstock of a woodworking lathe, and more particularly to a tailstock provided with an adjustable collar that can synchronously move an axial connecting shaft so as to calibrate and adjust the central axis of the tailstock.

Description of Related Arts

FIG. 1 illustrates a conventional woodworking lathe. A machine 10 includes a base 11. The base 11 has an axial dovetail groove 12 thereon. A headstock 13 as a driving end and a tailstock 14 as a driven end are disposed on the base 11. The respective bottoms of the headstock 13 and the tailstock 14 are embedded from the two sides of the dovetail groove 12 and can be moved on the base 11 along the dovetail groove 12. The headstock 13 is provided with a driving shaft seat 16 that is driven by a motor 15. The tailstock 14 is provided with a driven shaft seat 17. The axis of the driving shaft seat 16 and the axis the driven shaft seat 17 are coaxial. In use, the wood is placed between the headstock 13 and the tailstock 14, and then the distance between the headstock 13 and the tailstock 14 is adjusted for the two ends of the wood to be clamped between the driving shaft seat 16 of the headstock 13 and the driven shaft seat 17 of the tailstock 14. However, after the components of the above structure are manufactured, there will be a tolerance between the components for processing. The total tolerances of the components after assembly causes the ends of the driving shaft seat 16 and the driven shaft seat 17 to be misaligned, that is, the axis line 161 of the driving shaft seat 16 and the axis line 171 of the driven shaft seat 17 are not coaxial. When the woodworking lathe cuts the wood, the wood will be deflected to generate deviation, resulting in poor cutting precision. Accordingly, the inventor of the present invention has devoted himself based on his many years of practical experiences to solve these problems.

SUMMARY OF THE PRESENT INVENTION

The primary object of the present invention is to provide a central axis adjustment structure of a tailstock of a woodworking lathe to solve the above problems. A gap is defined between a guide rod and a horizontal circular hole in the tailstock, and another gap is defined between an axial connecting shaft and the horizontal circular hole. The front end of the axial connecting shaft is sleeved with a collar that can be adjusted up and down as well as left and right, thereby synchronously adjusting the axial connecting shaft and the guide rod through the gaps, so that the central axis of the tailstock can be adjusted and calibrated.

In order to achieve the above object, a central axis adjustment structure of a tailstock of a woodworking lathe is provided. A horizontal circular hole is formed in the tailstock of the woodworking lathe. A front opening and a rear opening are defined at front and rear ends of the tailstock, respectively. An end surface of the front opening is formed with at least one screw hole. A guide rod is disposed in the horizontal circular hole. A rear end of the guide rod extends out of the rear opening. A collar having a through hole is fitted onto an axial connecting shaft. The axial connecting shaft is inserted in the horizontal circular hole. The guide rod is insertedly connected to a rear end of the axial connecting shaft. The collar is formed with at least one perforation corresponding to the screw hole at a periphery of the through hole. At least one bolt is inserted through the perforation and screwed to the screw hole so that the collar is locked to the front end of the tailstock. A first annular gap is defined between the guide rod and the rear opening of the tailstock. A second annular gap is defined between the axial connecting shaft and the front opening of the tailstock. A third annular gap is defined between the bolt and the perforation of the collar.

By loosening the bolt to move within the perforation of the collar so as to adjust the position of the collar, the axial connecting shaft and the guide rod are synchronously moved, so that the central axis of the tailstock can be adjusted and calibrated.

DETAILED DESCRIPTION OF THE PREFERRED EMBODIMENT

Figure 1:
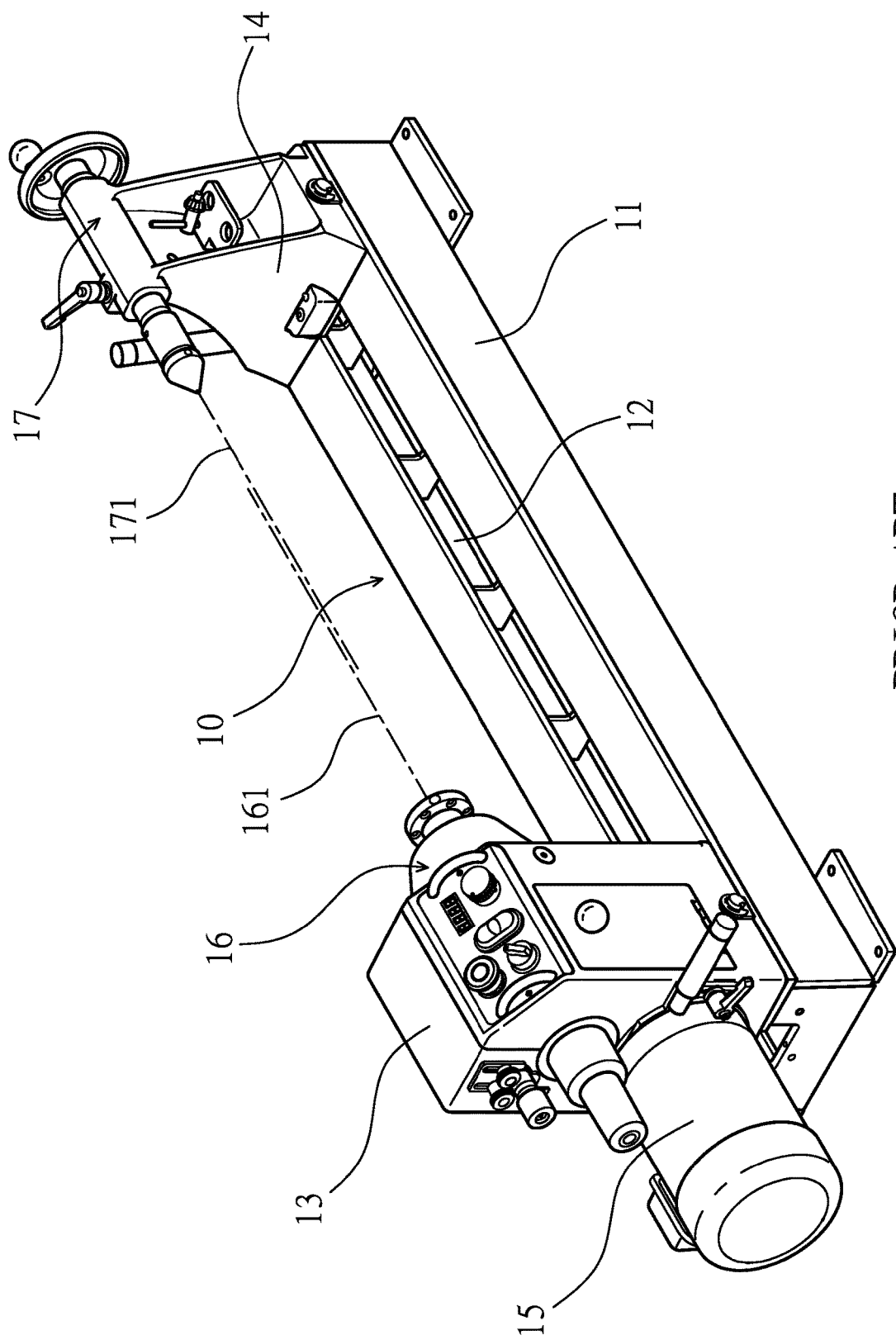
FIG. 1 is a perspective view of a conventional woodworking lathe.
Figure 2:
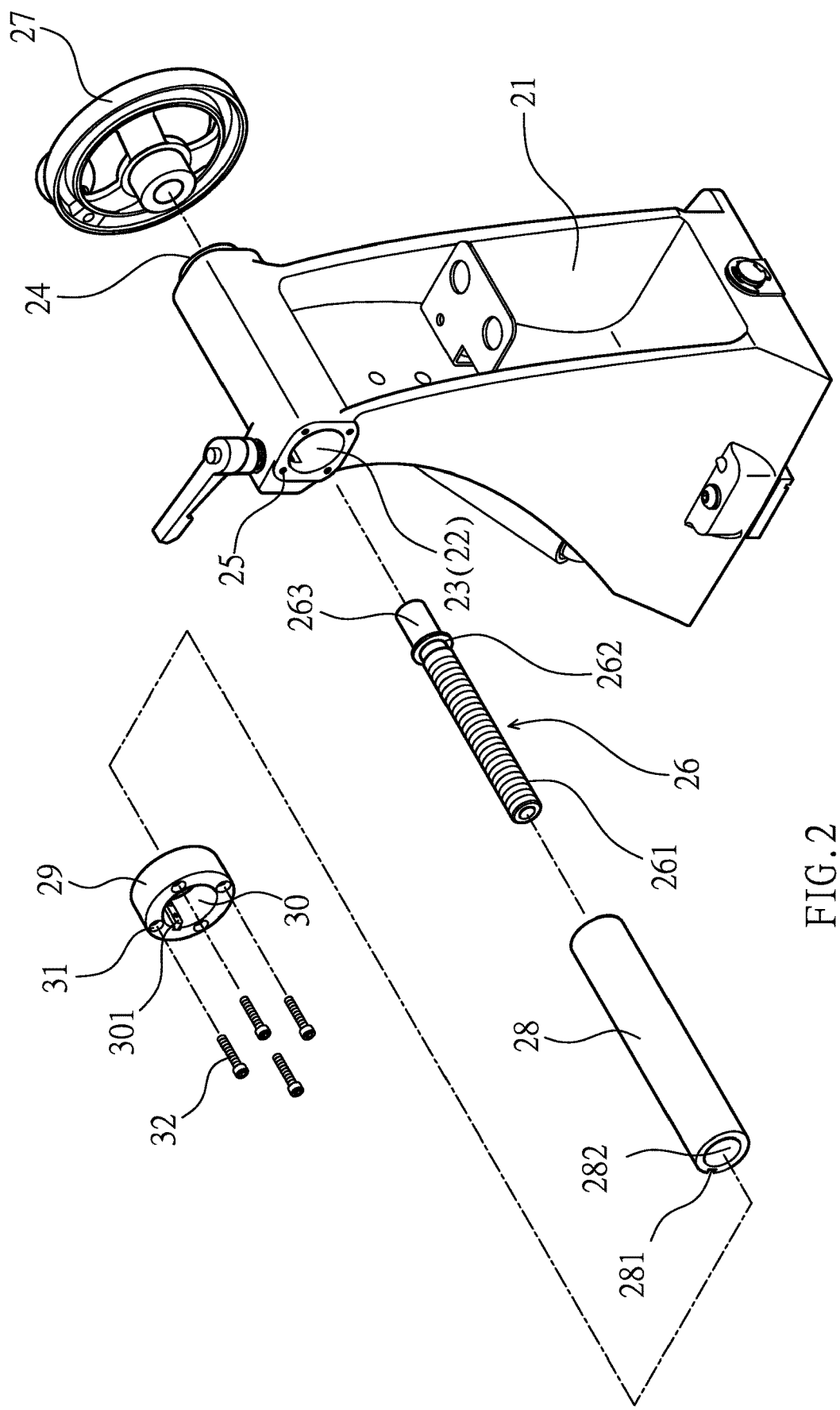
FIG. 2 is an exploded view of the present invention.
Figure 3:
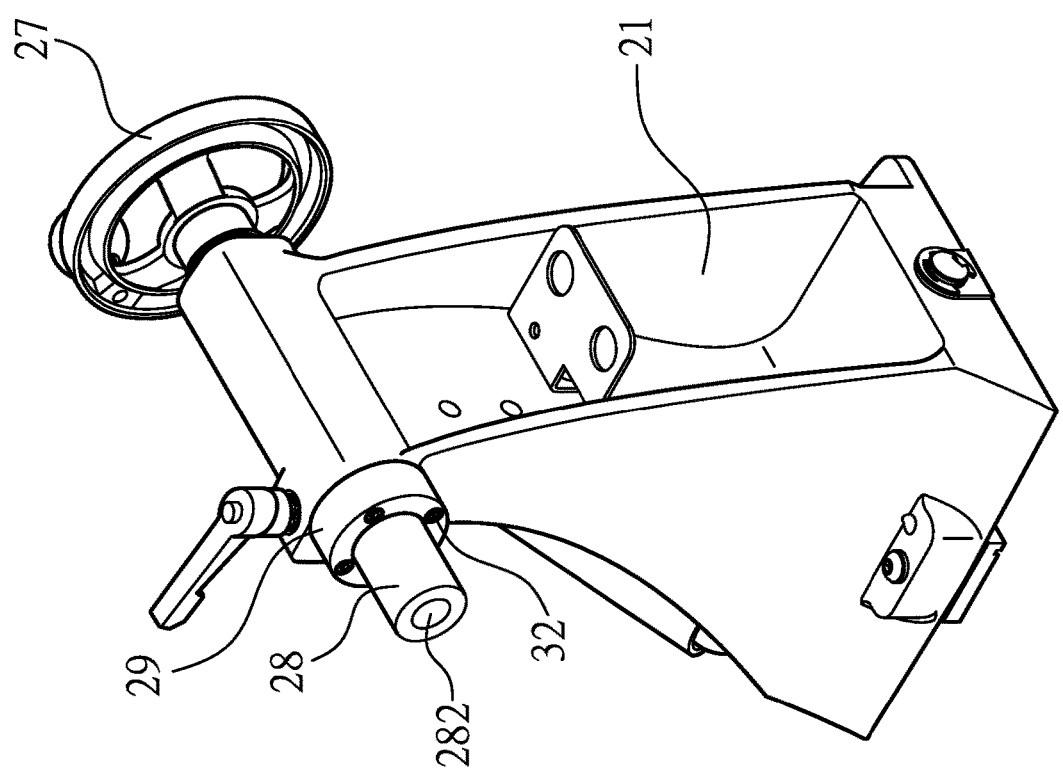
FIG. 3 is a perspective view of the present invention.
Figure 4:
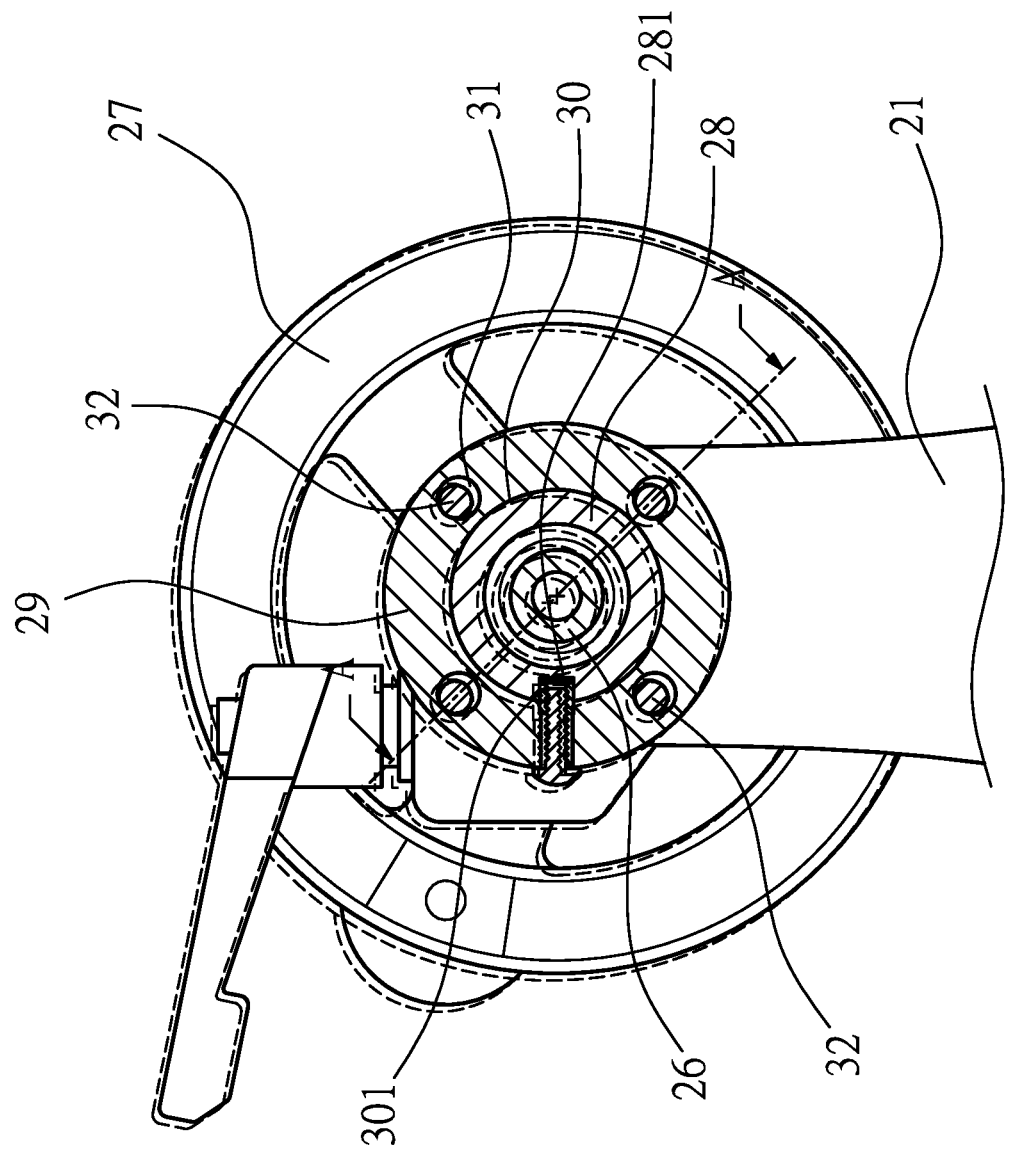
FIG. 4 is a front sectional view of the present invention.
Figure 5:
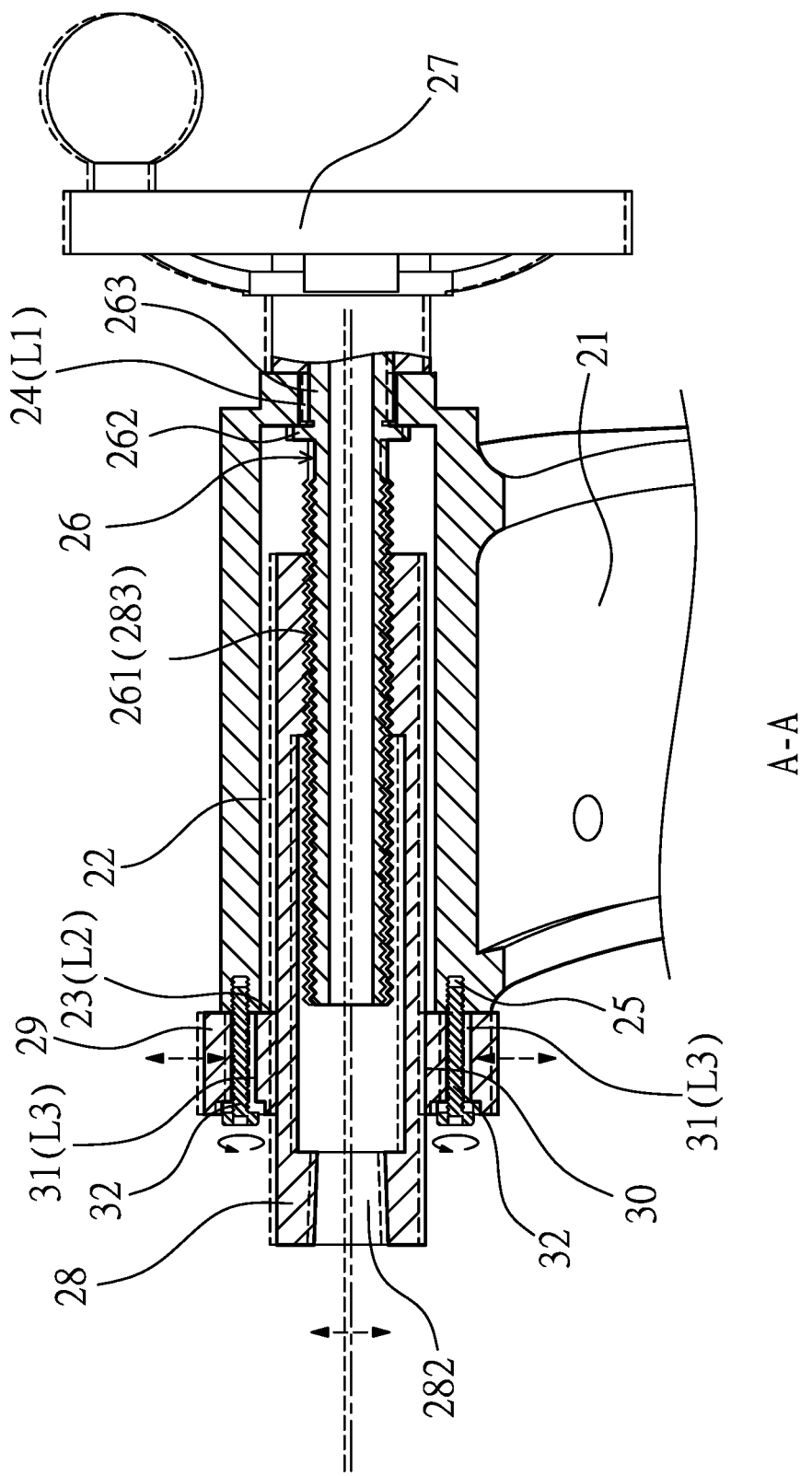
FIG. 5 is a side sectional view of the present invention.

Embodiments of the present invention will now be described, by way of example only, with reference to the accompanying drawings.

Referring to FIG. 2 through FIG. 5, a horizontal circular hole 22 is formed in a tailstock 21 of a woodworking lathe. A front opening 23 and a rear opening 24 are defined at front and rear ends of the tailstock 21, respectively. An end surface of the front opening 23 is formed with at least one screw hole 25. A guide rod 26 is disposed in the horizontal circular hole 22. The guide rod 26 has a threaded section 261, a raised ring 262 and an extension section 263 that are arranged from the front to the rear. The extension section 263 of the guide rod 26 is inserted through the horizontal circular hole 22 from the front opening 23, and the raised ring 262 is positioned against the inner circumference of the rear opening 24, and the extension portion 263 of the guide rod 26 extends out of the rear opening 24 to be connected with a hand wheel 27. An outer peripheral surface of an axial connecting shaft 28 is formed with an axial guide groove 281. The front end of the axial connecting shaft 28 has an axial connecting hole 282, and the rear end of the axial connecting shaft 28 has an inner screw hole 283. A collar 29 having a through hole 30 is sleeved onto the axial connecting shaft 28. A protrusion 301 is disposed on the inner circumference of the through hole 30. The collar 29 is fitted onto the axial connecting shaft 28 through the through hole 30, and the protrusion 301 is embedded in the guide groove 281. The axial connecting shaft 28 is inserted in the horizontal circular hole 22, and the inner screw hole 283 of the axial connecting shaft 28 is screwed to the threaded section 261 of the guide rod 26. The collar 29 is formed with at least one perforation 31 corresponding to the screw hole 25 at the periphery of the through hole 30. At least one bolt 32 is inserted through the perforation 31 and screwed to the screw hole 25, so that the collar 29 is locked to the front end of the tailstock 21. A first annular gap L1 is defined between the extension section 263 of the guide rod 26 and the rear opening 24 of the tailstock 21. A second annular gap L2 is defined between the axial connecting shaft 28 and the front opening 23 of the tailstock 21. A third annular gap L3 is defined between the bolt 32 and the perforation 31 of the collar 29. By loosening the bolt 32 to move within the aperture 31 of the collar 29 so as to adjust the position of the collar 29, the axial connecting shaft 28 and the guide rod 26 are synchronously moved so that the central axis of the tailstock 21 can be adjusted and calibrated.

The assembly of the present invention is described in detail below. Referring to FIG. 2 to FIG. 5, in the present invention, when the hand wheel 27 is rotated forward and reversely by an external force, the guide rod 26 is synchronously rotated. The immovable protrusion 301 is embedded in the guide groove 281 of the axial connecting shaft 28, thereby restricting the axial connecting shaft 28 from rotating. The axial connecting shaft 28 can only advance or retreat in the direction of the guide groove 281. When the components of the woodworking lathe have tolerances and the central axis of the tailstock 21 is not exactly aligned with the central axis of the headstock (not shown) of the woodworking lathe, firstly, the bolt 32 is unscrewed to loosen the collar 29, that is, the collar 29 can be moved up and down as well as left and right via the third annular gap L3. Because there is no gap between the axial connecting shaft 28 and the collar 29, the guide rod 26 and the axial connecting shaft 28 are synchronously moved up and down as well as left and right via the first annular gap L1 and the second annular gap L2. In this way, the collar 29 can move up and down as well as left and right through the perforation 31, so that the central axis of the tailstock 21 can be adjusted to be aligned with the central axis of the headstock.

Figure 6:
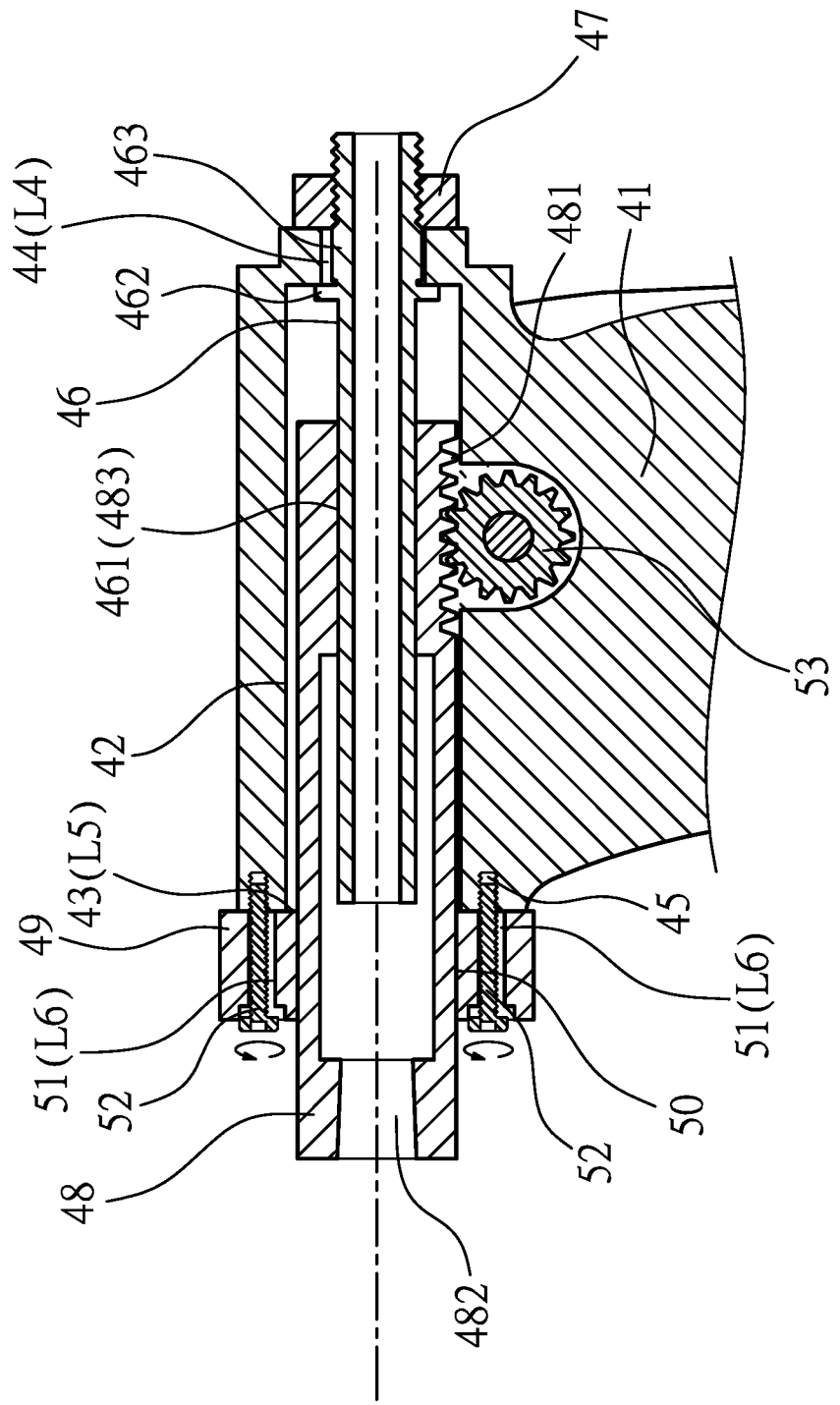
FIG. 6 is a side sectional view of another embodiment of the present invention.

According to the above technical means, the present invention can also implement the embodiment as shown in FIG. 6. A horizontal circular hole 42 is formed in a tailstock 41. A front opening 43 and a rear opening 44 are defined at front and rear ends of the horizontal circular hole 42 of the tailstock 41, respectively. An end surface of the front opening 43 is formed with a plurality of screw holes 45. A guide rod 46 is disposed in the horizontal circular hole 42. The guide rod 46 has a guide section 461, a raised ring 462 and a threaded extension section 463 that are arranged from the front to the rear. The threaded extension section 463 of the guide rod 46 is inserted through the horizontal circular hole 42 from the front opening 43, and the raised ring 462 is positioned against the inner circumference of the rear opening 44, and the threaded extension portion 463 of the guide rod 46 extends out of the rear opening 44 to be connected with a nut 47. An outer peripheral surface of an axial connecting shaft 48 is provided with a toothed rack 481. The front end of the axial connecting shaft 48 has an axial connecting hole 482, and the rear end of the axial connecting shaft 48 has a rear through hole 483. A collar 49 having a through hole 50 is sleeved onto the axial connecting shaft 48. The collar 49 is fitted onto the axial connecting shaft 48 through the through hole 50. The axial connecting shaft 48 is inserted in the horizontal circular hole 42, and the guide section 461 of the guide rod 46 is inserted into the rear through hole 483 of the axial connecting shaft 48. The collar 49 is provided with a plurality of perforations 51 corresponding to the screw holes 45 at the periphery of the through hole 50. Bolts 52 are inserted through the perforations 51 and screwed to the screw holes 45, so that the collar 49 is locked to the front end of the tailstock 41. The toothed rack 481 is elastically pressed against a driving gear 53. The driving gear 53 is driven by an external force to advance or retreat the axial connecting shaft 48. A first annular gap L4 is defined between the threaded extension section 463 of the guide rod 46 and the rear opening 44. A second annular gap L5 is defined between the axial connecting shaft 48 and the front opening 43. A third annular gap L6 is defined between the bolt 52 and the perforation 51. By loosening the bolt 52 to move within the aperture 51 of the collar 49 so as to adjust the position of the collar 49, the axial connecting shaft 48 and the guide rod 46 are synchronously moved, so that the central axis of the tailstock 41 can be adjusted and calibrated.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A tailstock of a woodworking lathe, for aligning with a headstock of the woodworking lathe, comprising:
  a guide rod comprising a guide section, a raised ring and an extension section from a front to a rear of said tailstock;
  an axial connecting shaft having a rear through hole, wherein said guide section of said guide rod is insertedly connected to said rear through hole of said axial connecting shaft; and
  a collar sleeved onto said axial connecting shaft without gap, wherein said guide rod and said axial connecting shaft are inserted through a horizontal circular hole formed in said tailstock with said collar locked to a front opening of said horizontal circular hole of said tailstock, wherein said extension section of said guide rod is inserted through said horizontal circular hole from said front opening, wherein said raised ring is positioned against an inner circumference of a rear opening of said horizontal circular hole of said tailstock, wherein said extension section of said guide rod is extended out of said rear opening of said horizontal circular hole of said tailstock, wherein a first annular gap is defined between said extension section of said guide rod and said rear opening of said horizontal circular hole and a second annular gap is defined between said axial connecting shaft and said front opening of said horizontal circular hole.

2. The tailstock, as recited in claim 1, wherein said collar has a through hole and at least one perforation formed at periphery of said through hole of said collar for locking said collar to said front opening of said tailstock with at least one bolt inserted through said perforation with at least one third gap formed between said bolt and said perforation, wherein said collar is fitted onto said axial connecting shaft through said through hole.

3. The tailstock, as recited in claim 2, wherein said collar further comprises a protrusion formed on an inner circumference of said through hole of said collar, wherein said axial connecting shaft further has an axial guide groove formed on an outer peripheral surface of said axial connecting shaft, wherein said protrusion of said collar is embedded in said axial guide groove.

4. The tailstock, as recited in claim 3, wherein said guide section of said guide rod is a threaded section, wherein said rear through hole of said axial connecting shaft is an inner screw hole screwed to said threaded section of said guide rod.

5. The tailstock, as recited in claim 4, further comprising a hand wheel connected with said extension section of said guide rod to said rear opening of said horizontal circular hole of said tailstock, such that said guide rod is able to be synchronously rotated with said hand wheel.

6. The tailstock, as recited in claim 3, further comprising a driving gear, wherein an outer peripheral surface of said axial connecting shaft is provided with a toothed rack, wherein said toothed rack is elastically pressed against said driving gear, such that said axial connecting shaft is able to be driven by said driving gear.

7. The tailstock, as recited in claim 6, wherein said extension section of said guide rod is a threaded extension section extended out of said rear opening so as to be connected with a nut.

\* \* \* \* \*